(12) United States Patent
Arad

(10) Patent No.: US 7,818,795 B1
(45) Date of Patent: Oct. 19, 2010

(54) PER-PORT PROTECTION AGAINST DENIAL-OF-SERVICE AND DISTRIBUTED DENIAL-OF-SERVICE ATTACKS

(75) Inventor: Nir Arad, Nesher (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 1045 days.

(21) Appl. No.: 11/209,083

(22) Filed: Aug. 22, 2005

Related U.S. Application Data

(60) Provisional application No. 60/669,457, filed on Apr. 7, 2005.

(51) Int. Cl.
*G06F 9/00* (2006.01)

(52) U.S. Cl. ......................................................... 726/13

(58) Field of Classification Search .................... 726/13
See application file for complete search history.

(56) References Cited

U.S. PATENT DOCUMENTS

| | | | |
|---|---|---|---|
| 6,789,203 B1 | 9/2004 | Belissent | |
| 6,880,090 B1 | 4/2005 | Shawcross | |
| 6,886,102 B1 | 4/2005 | Lyle | |
| 7,266,754 B2 | 9/2007 | Shah et al. | |
| 2005/0050364 A1 | 3/2005 | Feng | |
| 2005/0111367 A1* | 5/2005 | Chao et al. | 370/235 |
| 2005/0254488 A1* | 11/2005 | Huang | 370/389 |
| 2006/0291458 A1* | 12/2006 | Liu et al. | 370/375 |

* cited by examiner

*Primary Examiner*—Kambiz Zand
*Assistant Examiner*—Aubrey H Wyszynski

(57) ABSTRACT

An apparatus having a corresponding method and computer program comprises one or more ports each to transmit and receive packets of data; a classifier to determine one or more attributes for each of the packets of data; one or more counters for each of the ports, wherein each counter counts a number of the packets of data passing through the respective one of the ports and having a predetermined attribute, wherein a respective counter threshold is associated with each of the counters; and a security circuit to cause each of the ports to perform at least one of a plurality of predetermined actions when a count of a respective one of the counters exceeds a respective counter threshold.

33 Claims, 3 Drawing Sheets

PER-PORT PROTECTION AGAINST DENIAL-OF-SERVICE AND DISTRIBUTED DENIAL-OF-SERVICE ATTACKS

CROSS-REFERENCE TO RELATED APPLICATIONS

This application claims the benefit of U.S. Provisional Patent Application Ser. No. 60/669,457 entitled "DoS and DDoS Protection in Desktop Switches," filed Apr. 7, 2005, the disclosure thereof incorporated by reference herein in its entirety.

BACKGROUND

The present invention relates generally to data communications. More particularly, the present invention relates to per-port protection against denial-of-service and distributed denial-of-service attacks for network switches.

SUMMARY

In general, in one aspect, the invention features an apparatus comprising: one or more ports each to transmit and receive packets of data; a classifier to determine one or more attributes for each of the packets of data; one or more counters for each of the ports, wherein each counter counts a number of the packets of data passing through the respective one of the ports and having a predetermined attribute, wherein a respective counter threshold is associated with each of the counters; and a security circuit to cause each of the ports to perform at least one of a plurality of predetermined actions when a count of a respective one of the counters exceeds a respective counter threshold.

In some embodiments, the plurality of actions comprises: dropping packets having the predetermined attribute, limiting a rate of reception by the respective one of the ports of packets having the predetermined attribute, limiting a rate of transmission by the respective one of the ports of packets having the predetermined attribute, dropping all packets received by the respective one of the ports, and dropping all packets to be transmitted by the respective one of the ports. In some embodiments, the security circuit alerts a system administrator of an attack when a count of one of the counters exceeds a respective counter threshold. In some embodiments, the one or more ports comprises a plurality of the ports, further comprising: a forwarding engine to transfer the packets of data among the ports. Some embodiments comprise a network switch comprising the apparatus. Some embodiments comprise a processor to route the packets of data. Some embodiments comprise a router comprising the apparatus. Some embodiments comprise a host interface circuit to transmit and receive the data. Some embodiments comprise network interface controller comprising the apparatus. Some embodiments comprise a host comprising the network interface controller. In some embodiments, the predetermined attribute indicates a network attack. In some embodiments, the predetermined attribute indicates at least one of the group consisting of: the packet is a Transmission Control Protocol synchronize (TCP SYN) packet; the packet is an Internet Control Message Protocol (ICMP) echo request packet; the packet is a User Datagram Protocol (UDP) echo request packet; and the packet is a port scanning packet.

In general, in one aspect, the invention features an apparatus comprising: one or more port means each for transmitting and receiving packets of data; means for determining one or more attributes for each of the packets of data; one or more counter means for each of the port means, wherein each counter means counts a number of the packets of data passing through the respective one of the port means and having a predetermined attribute, wherein a respective counter threshold is associated with each of the counter means; and means for causing each of the port means to perform at least one of a plurality of predetermined actions when a count of a respective one of the counter means exceeds a respective counter threshold.

In some embodiments, the plurality of actions comprises: dropping packets having the predetermined attribute, limiting a rate of reception by the respective one of the port means of packets having the predetermined attribute, limiting a rate of transmission by the respective one of the port means of packets having the predetermined attribute, dropping all packets received by the respective one of the port means, and dropping all packets to be transmitted by the respective one of the port means. In some embodiments, the means for causing alerts a system administrator of an attack when a count of one of the counter means exceeds a respective counter threshold. In some embodiments, the one or more port means comprises a plurality of the port means, further comprising: means for transferring the packets of data among the port means. Some embodiments comprise a network switch comprising the apparatus. Some embodiments comprise means for routing the packets of data. Some embodiments comprise a router comprising the apparatus. Some embodiments comprise means for transmitting and receiving the data. Some embodiments comprise a network interface controller comprising the apparatus. Some embodiments comprise a host comprising the network interface controller. In some embodiments, the predetermined attribute indicates a network attack. In some embodiments, the predetermined attribute indicates at least one of the group consisting of: the packet is a Transmission Control Protocol synchronize (TCP SYN) packet; the packet is an Internet Control Message Protocol (ICMP) echo request packet; the packet is a User Datagram Protocol (UDP) echo request packet; and the packet is a port scanning packet.

In general, in one aspect, the invention features a method for an apparatus comprising one or more ports, the method comprising: transmitting and receiving packets of data on the ports; determining one or more attributes for each of the packets of data; keeping one or more counts, for each of the ports, of a number of the packets of data passing through the respective one of the ports and having a predetermined attribute, wherein a respective count threshold is associated with each of the counts; and causing each of the ports to perform at least one of a plurality of predetermined actions when a count of a respective one of the counters exceeds a respective counter threshold.

In some embodiments, the plurality of actions comprises dropping packets having the predetermined attribute, limiting a rate of reception by the respective one of the ports of packets having the predetermined attribute, limiting a rate of transmission by the respective one of the ports of packets having the predetermined attribute, dropping all packets received by the respective one of the ports, and dropping all packets to be transmitted by the respective one of the ports. Some embodiments comprise alerting a system administrator of an attack when one of the counts exceeds a respective counter threshold. In some embodiments, the one or more ports comprises a plurality of the ports, the method further comprising: transferring the packets of data among the ports. Some embodiments comprise routing the packets of data. Some embodiments comprise transmitting and receiving the data. In some embodiments, the predetermined attribute indicates a network attack. In some embodiments, the predetermined attribute indicates at least one of the group consisting of: the packet is a Transmission Control Protocol synchronize (TCP SYN) packet; the packet is an Internet Control Message Protocol (ICMP) echo request packet; the packet is a User Datagram Protocol (UDP) echo request packet; and the packet is a port scanning packet.

In general, in one aspect, the invention features a computer program for an apparatus comprising one or more ports to transmit and receive packets of data, the method comprising: determining one or more attributes for each of the packets of data; keeping one or more counts, for each of the ports, of a number of the packets of data passing through the respective one of the ports and having a predetermined attribute, wherein a respective count threshold is associated with each of the counts; and causing each of the ports to perform at least one of a plurality of predetermined actions when a count of a respective one of the counters exceeds a respective counter threshold.

In some embodiments, the plurality of actions comprises dropping packets having the predetermined attribute, limiting a rate of reception by the respective one of the ports of packets having the predetermined attribute, limiting a rate of transmission by the respective one of the ports of packets having the predetermined attribute, dropping all packets received by the respective one of the ports, and dropping all packets to be transmitted by the respective one of the ports. Some embodiments comprise alerting a system administrator of an attack when one of the counts exceeds a respective counter threshold. Some embodiments comprise routing the packets of data. Some embodiments comprise transmitting and receiving the data. In some embodiments, the predetermined attribute indicates a network attack. In some embodiments, the predetermined attribute indicates at least one of the group consisting of: the packet is a Transmission Control Protocol synchronize (TCP SYN) packet; the packet is an Internet Control Message Protocol (ICMP) echo request packet; the packet is a User Datagram Protocol (UDP) echo request packet; and the packet is a port scanning packet.

The details of one or more implementations are set forth in the accompanying drawings and the description below. Other features will be apparent from the description and drawings, and from the claims.

Figure 1:
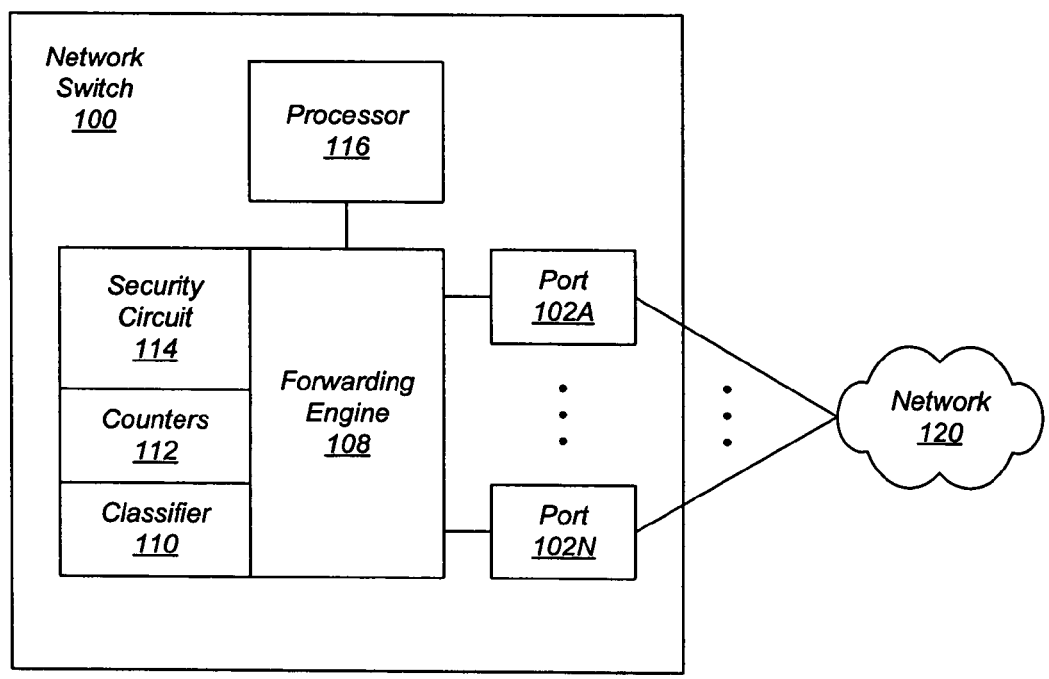
FIG. 1 shows a network switch according to a preferred embodiment of the present invention.

The leading digit(s) of each reference numeral used in this specification indicates the number of the drawing in which the reference numeral first appears.

DETAILED DESCRIPTION

The data communications networking industry is well aware of a number of malicious network-based attacks that are collectively described as denial-of-service (DoS) attacks and distributed denial-of-service (DDoS) attacks. DoS and DDoS attacks are attacks on a computer system or network that cause a loss of service to users, generally the loss of network connectivity and services, by consuming the bandwidth of the victim network or overloading the computational resources of the victim system.

In a DoS attack, the resources of a networked device, such as a web server or an Internet protocol (IP) router, are consumed by the attacker to the point where the device is no longer able to service legitimate requests. A DDoS attack is a DoS attack where the attack comes from multiple sources (that is, the attack source is distributed). The sources may be synchronized manually or automatically. In the latter case, the sources are referred to as "zombies" and are controlled by a central control console. A DDoS attack can be more powerful than a DoS attack because it generates more traffic, and may be harder to stop.

The industry has responded by deploying various protection measures within networks in high-end networking equipment such as backbone switches and edge/enterprise-core routers. However, these high-end networking devices are generally aggregations points for many networked devices, such as hosts, servers, printers, and the like. Protecting all of these devices consumes significant computing resources at the aggregation device, such as memory, as well as significant management resources. In addition, these DoS and DDoS protections can affect the performance and service levels for well-behaved traffic. Further, because this type of protection is limited to traffic that flows through the aggregation device, hosts within a local-area network (LAN) or virtual LAN (VLAN) environment can still be compromised and attack each other.

The inventor has recognized that protections against DoS and DDoS attacks can be more efficient and effective when implemented on a per-port basis in a local network device, such as a desktop switch or network interface controller (NIC). These devices connect directly to networked devices. For example, each port of a desktop switch connects to only one or two such hosts, for example a personal computer and an IP phone.

Embodiments of the present invention implement DoS and DDoS prevention mechanisms, such as filtering, rate limiting, and the like, on a per-port basis. This approach mitigates the aforementioned limitations of conventional approaches, and has several advantages. Preferably no soft resources, such as memory, are required in hard-wired hardware implementations. Management is simplified and reduced to port=host. There is no performance impact because it is much easier to mitigate attacks at port speed compared to an aggregation point. Full protection is provided for both routed traffic and traffic which is bridged inside a LAN or VLAN.

FIG. 1 shows a network switch 100 according to a preferred embodiment of the present invention. While embodiments of the present invention are described with reference to network switch 100, other embodiments can be implemented in other sorts of network devices, as will be apparent to one skilled in the relevant arts after reading this description.

Network switch 100 comprises a plurality of ports 102A-N to transmit and receive packets of data, for example to and from a network 120 and a forwarding engine 108 to transfer the packets of data among ports 102. Network switch 100 also comprises a classifier 110 to determine one or more attributes of each of the packets of data, one or more counters 112 for each of the ports 102 each to count a number of the packets of data passing through the respective port 102 and having a predetermined attribute, and a security circuit 114 to cause each of the ports 102 to perform at least one of a plurality of predetermined actions when a count of a respective one of the counters 112 exceeds a respective counter threshold. Counters 112 are preferably reset regularly, for example periodically after a predetermined interval, which can be configurable. Thus, when the rate of traffic with specified attributes exceeds a predetermined, configurable threshold, one or more predetermined actions are taken. Network switch 100 also preferably comprises a processor 116. In some embodiments, network switch 100 is implemented as a router. According to these embodiments, processor 116 routes the packets of data.

Figure 2:
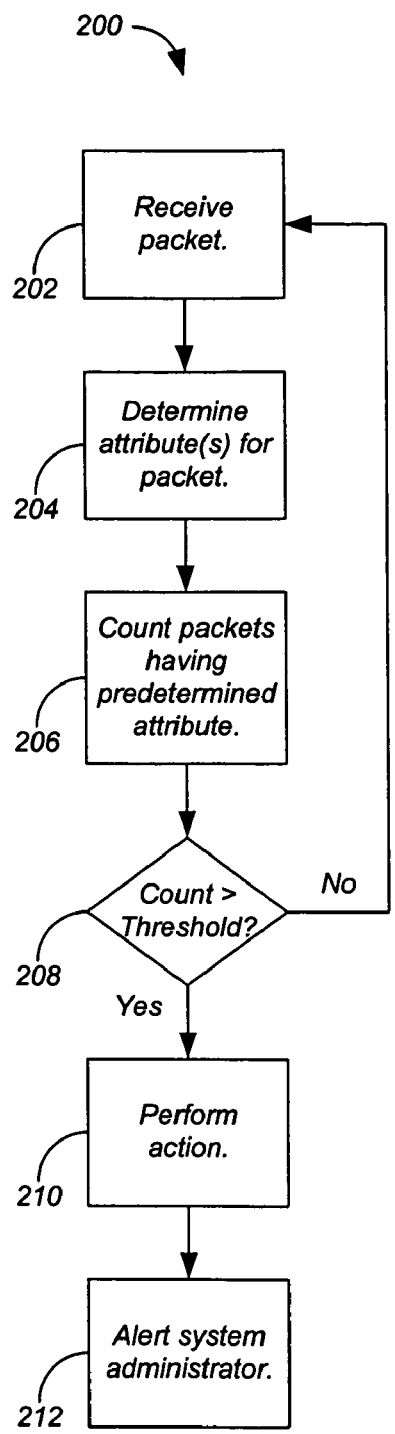
FIG. 2 shows a process for the network switch of FIG. 1 according to a preferred embodiment of the present invention.

FIG. 2 shows a process 200 for network switch 100 of FIG. 1 according to a preferred embodiment of the present invention. Ports 102 receive packets of data (step 202), both from network 120 and from forwarding engine 108. Network switch 100 can examine packets after receipt from network 120, before transmission to network 120, or both. Classifier 110 determines one or more attributes for each of the packets of data received by ports 102 (step 204). Counters 112 each keep a count, for the respective port 102, of a number of the packets of data passing through the port during a predetermined interval and having a predetermined attribute (step 206). Preferably, a certain rate of packets with the predetermined attribute indicates a network attack. For example, the predetermined attribute can indicate the packet is a Transmission Control Protocol synchronize (TCP SYN) packet, the packet is an Internet Control Message Protocol (ICMP) echo request packet, the packet is a User Datagram Protocol (UDP) echo packet, the packet is a port scanning packet, the packet appears to contain malicious software, and the like.

A counter threshold is associated with each counter 112. When the count kept by a counter exceeds the respective counter threshold (step 208), security circuit 114 causes the respective port 102 to perform at least one of a plurality of actions (step 210). Preferably the actions comprise dropping packets having the predetermined attribute, limiting a rate of reception by the respective port 102 of packets having the predetermined attribute, limiting a rate of transmission by the respective port 102 of packets having the predetermined attribute, dropping all packets received by the respective port 102, dropping all packets to be transmitted by the respective port 102, and the like, although other actions can be performed. Preferably security circuit 114 also alerts a system administrator of the attack (step 212), for example by sending an email message to the system administrator.

For example, one type of DoS/DDoS attack, referred to as a "SYN flood" is a form of attack in which an attacker sends a succession of TCP SYN requests to a target system. The target responds by sending SYN-ACK back to the attacker and waiting for the attacker to send a corresponding ACK packet, which the attacker never sends. If this "half-open" connection binds resources at the target, as is the case in many operating systems, the attacker can consume all of the target's resources by flooding the target with SYN messages. Once all of the target's resources that are set aside for half-open connections are reserved, no new connections can be made, resulting in denial of service. By taking appropriate action as described above, network switch 100 can protect against this sort of attack. For example, when the rate of SYN packets received by a port 102 exceeds a predetermined threshold, the port 102 starts dropping all received packets. Of course port 102 can take other actions, for example as described above.

As another example, another type of DoS/DDoS attack, referred to as a "smurf" attack, is a form of attack which uses spoofed broadcast ping messages to flood a target system. In such an attack, the attacker sends a large amount of ICMP echo (ping) traffic to IP broadcast addresses, all of it having a spoofed source address of the victim of the attack. If the routing device delivering traffic to those broadcast addresses performs the IP broadcast to layer 2 broadcast function, most hosts on that IP network will take the ICMP echo request and reply to it with an echo reply each, multiplying the traffic by the number of hosts responding. On a multi-access broadcast network, potentially hundreds of machines might reply to each packet. By taking appropriate action as described above, network switch 100 can protect against this sort of attack. For example, when the number of ICMP echo request packets received by a port 102 exceeds a predetermined threshold, the port 102 starts dropping all received packets. Of course port 102 can take other actions, for example as described above.

A similar type of DoS/DDoS attack is the "fraggle" attack, where the ICMP echo request is replaced by a UDP echo request. By taking appropriate action as described above, network switch 100 can protect against this sort of attack. For example, when the number of UDP echo request packets received by a port 102 exceeds a predetermined threshold, the port 102 starts dropping all received packets. Of course port 102 can take other actions, for example as described above.

As another example, while port scanning can have legitimate uses, it is often a precursor of a DoS/DDoS attack. By taking appropriate action as described above, network switch 100 can prevent the ensuing attack. Several types of packets are used for port scanning, and are referred to herein for convenience as "port scanning packets." For example, when the rate of port scanning packets received by a port 102 exceeds a predetermined threshold, the port 102 starts dropping all received packets. Of course port 102 can take other actions, for example as described above.

Figure 3:
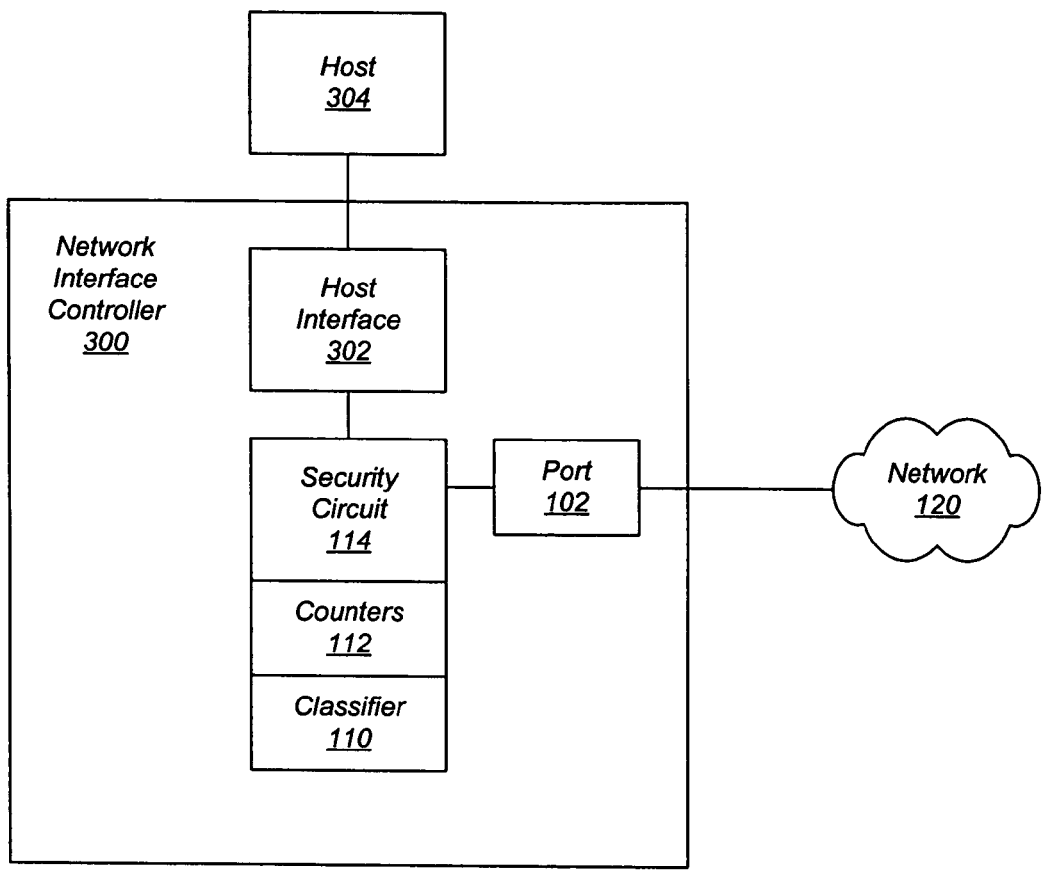
FIG. 3 shows a network interface controller according to a preferred embodiment of the present invention.

As mentioned above, other sorts of network devices can be implemented according to preferred embodiments of the present invention. FIG. 3 shows a network interface controller 300 according to a preferred embodiment of the present invention. Network interface controller 300 comprises one or more ports 102 to transmit and receive packets of data, for example to and from a network 120, and a host interface circuit 302 to transmit and receive the data, for example to and from an optional host 304.

Network interface controller 300 also comprises a classifier 110 to determine one or more attributes of each of the packets of data, one or more counters 112 for each of the ports 102 each to count a number of the packets of data passing through the respective port 102 and having a predetermined attribute, and a security circuit 114 to cause each of the ports 102 to perform at least one of a plurality of actions when a count of a respective one of the counters 112 exceeds a respective counter threshold. Network interface controller 300 functions generally as described above for network switch 100.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network interface controller (NIC) comprising:
one or more ports of the NIC each to transmit and receive packets of data over a network;
a classifier to determine one or more attributes for each of the packets of data;
one or more counters for each of the ports, wherein each counter counts a number of the packets of data passing through the respective one of the ports and having a predetermined attribute, wherein a respective counter threshold is associated with each of the counters; and
a security circuit to cause each of the ports to perform at least one of a plurality of predetermined actions including dropping all packets to be transmitted to the network by the respective one of the ports when a count of a respective one of the counters exceeds the respective counter threshold.

2. The NIC of claim 1, wherein the plurality of actions comprises:
dropping packets having the predetermined attribute,
limiting a rate of reception by the respective one of the ports of packets having the predetermined attribute,
limiting a rate of transmission by the respective one of the ports of packets having the predetermined attribute, and
dropping all packets received by the respective one of the ports.

3. The NIC of claim 1, wherein the security circuit alerts a system administrator of an attack when a count of one of the counters exceeds a respective counter threshold.

4. The NIC of claim 1, wherein the one or more ports comprises a plurality of the ports, further comprising:
a forwarding engine to transfer the packets of data among the ports.

5. The NIC of claim 4, further comprising:
a processor to route the packets of data.

6. The NIC of claim 1, further comprising:
a host interface circuit to transmit and receive the data.

7. A host comprising the network interface controller (NIC) of claim 6.

8. The NIC of claim 1, wherein the predetermined attribute indicates a network attack.

9. The NIC of claim 1, wherein the predetermined attribute indicates at least one of the group consisting of:
the packet is a Transmission Control Protocol synchronize (TCP SYN) packet;
the packet is an Internet Control Message Protocol (ICMP) echo request packet;
the packet is a User Datagram Protocol (UDP) echo request packet; and
the packet is a port scanning packet.

10. A network interface controller (NIC) comprising:
one or more port means of the NIC each for transmitting and receiving packets of data over a network;
means for determining one or more attributes for each of the packets of data;
one or more counter means for each of the port means, wherein each counter means counts a number of the packets of data passing through the respective one of the port means and having a predetermined attribute, wherein a respective counter threshold is associated with each of the counter means; and
means for causing each of the port means to perform at least one of a plurality of predetermined actions including dropping all packets to be transmitted to the network by the respective one of the port means when a count of a respective one of the counter means exceeds the respective counter threshold.

11. The NIC of claim 10, wherein the plurality of actions comprises:
dropping packets having the predetermined attribute,
limiting a rate of reception by the respective one of the port means of packets having the predetermined attribute,
limiting a rate of transmission by the respective one of the port means of packets having the predetermined attribute, and
dropping all packets received by the respective one of the port means.

12. The NIC of claim 10, wherein the means for causing alerts a system administrator of an attack when a count of one of the counter means exceeds a respective counter threshold.

13. The NIC of claim 10, wherein the one or more port means comprises a plurality of the port means, further comprising:
means for transferring the packets of data among the port means.

14. The NIC of claim 13, further comprising:
means for routing the packets of data.

15. The NIC of claim 10, further comprising:
means for transmitting and receiving the data.

16. A host comprising the network interface controller (NIC) of claim 15.

17. The NIC of claim 10, wherein the predetermined attribute indicates a network attack.

18. The NIC of claim 10, wherein the predetermined attribute indicates at least one of the group consisting of:
the packet is a Transmission Control Protocol synchronize (TCP SYN) packet;
the packet is an Internet Control Message Protocol (ICMP) echo request packet;
the packet is a User Datagram Protocol (UDP) echo request packet; and
the packet is a port scanning packet.

19. A method comprising:
transmitting and receiving packets of data over a network via one or more ports of a network interface controller (NIC);
determining one or more attributes for each of the packets of data;
keeping one or more counts, for each of the ports, of a number of the packets of data passing through the respective one of the ports and having a predetermined attribute, wherein a respective count threshold is associated with each of the counts; and
causing each of the ports to perform at least one of a plurality of predetermined actions including dropping all packets to be transmitted to the network by the respective one of the ports when a count for a respective one of the ports exceeds the respective count threshold.

20. The method of claim 19, wherein the plurality of actions comprises
dropping packets having the predetermined attribute,
limiting a rate of reception by the respective one of the ports of packets having the predetermined attribute,
limiting a rate of transmission by the respective one of the ports of packets having the predetermined attribute, and
dropping all packets received by the respective one of the ports.

21. The method of claim 19, further comprising:
alerting a system administrator of an attack when one of the counts exceeds a respective counter threshold.

22. The method of claim 19, wherein the one or more ports comprises a plurality of the ports, the method further comprising:
transferring the packets of data among the ports.

23. The method of claim 22, further comprising:
routing the packets of data.

24. The method of claim 19, further comprising:
transmitting and receiving the data.

25. The method of claim 19, wherein the predetermined attribute indicates a network attack.

26. The method of claim 19, wherein the predetermined attribute indicates at least one of the group consisting of:
the packet is a Transmission Control Protocol synchronize (TCP SYN) packet;
the packet is an Internet Control Message Protocol (ICMP) echo request packet;
the packet is a User Datagram Protocol (UDP) echo request packet; and
the packet is a port scanning packet.

27. A computer program stored on a computer-readable storage device comprising instructions executed by a processor for:
determining one or more attributes for packets of data transmitted and received by one or more ports of a network interface controller (NIC) over a network;
keeping one or more counts, for each of the ports, of a number of the packets of data passing through the respective one of the ports and having a predetermined attribute, wherein a respective count threshold is associated with each of the counts; and
causing each of the ports to perform at least one of a plurality of predetermined actions including dropping all packets to be transmitted to the network by the respective one of the ports when a count for a respective one of the ports exceeds the respective count threshold.

28. The computer program of claim 27, wherein the plurality of actions comprises
dropping packets having the predetermined attribute,
limiting a rate of reception by the respective one of the ports of packets having the predetermined attribute,
limiting a rate of transmission by the respective one of the ports of packets having the predetermined attribute, and
dropping all packets received by the respective one of the ports.

29. The computer program of claim 27, further comprising:
alerting a system administrator of an attack when one of the counts exceeds a respective counter threshold.

30. The computer program of claim 29, further comprising:
routing the packets of data.

31. The computer program of claim 27, further comprising:
transmitting and receiving the data.

32. The computer program of claim 27, wherein the predetermined attribute indicates a network attack.

33. The computer program of claim 27, wherein the predetermined attribute indicates at least one of the group consisting of:
the packet is a Transmission Control Protocol synchronize (TCP SYN) packet;
the packet is an Internet Control Message Protocol (ICMP) echo request packet;
the packet is a User Datagram Protocol (UDP) echo request packet; and
the packet is a port scanning packet.

* * * * *